United States Patent
Hebeler, Jr. et al.

(10) Patent No.: US 10,848,399 B2
(45) Date of Patent: *Nov. 24, 2020

(54) MEDIA DATA USAGE MEASUREMENT AND REPORTING SYSTEMS AND METHODS

(71) Applicant: The Nielsen Company (US), LLC, New York, NY (US)

(72) Inventors: John W. Hebeler, Jr., Ellicott City, MD (US); Prasad V. Kunchakarra, Clarksville, MD (US); Thomas L. Dietz, III, Ellicott City, MD (US)

(73) Assignee: The Nielsen Company (US), LLC, New York, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/129,763

(22) Filed: Sep. 12, 2018

(65) Prior Publication Data

US 2019/0014020 A1  Jan. 10, 2019

Related U.S. Application Data

(63) Continuation of application No. 15/216,680, filed on Jul. 21, 2016, now Pat. No. 10,103,951, which is a (Continued)

(51) Int. Cl.
*H04L 12/26* (2006.01)
*G06Q 30/02* (2012.01)
(Continued)

(52) U.S. Cl.
CPC ............ *H04L 43/04* (2013.01); *G06F 9/4488* (2018.02); *G06Q 30/0201* (2013.01);
(Continued)

(58) Field of Classification Search
None
See application file for complete search history.

(56) References Cited

U.S. PATENT DOCUMENTS

| 5,675,510 A | 10/1997 | Coffey et al. |
| 5,787,253 A | 7/1998 | McCreery et al. |

(Continued)

FOREIGN PATENT DOCUMENTS

| EP | 1045547 | 10/2000 |
| JP | H08190527 | 7/1996 |

(Continued)

OTHER PUBLICATIONS

United States Patent and Trademark Office, "Notice of Allowance," mailed in connection with U.S. Appl. No. 10/205,810, dated Jul. 21, 2009, 4 pages.

(Continued)

*Primary Examiner* — Qing Yuan Wu
(74) *Attorney, Agent, or Firm* — Hanley, Flight & Zimmerman, LLC (57) ABSTRACT

Methods and apparatus for gathering data for media usage reports for a processing device is disclosed. An example apparatus includes means for gathering first usage data representative of usage of first media on a processing device, the first media being received from an external network source, the first usage data corresponding to at least one of (i) a first media type or (ii) a first user agent associated with the media; means for gathering second usage data representative of usage of second media on the processing device, the second media being received from a source that is local to the processing device, the second usage data corresponding to at least one of (i) a second media type or (ii) a second user agent associated with the media; and means for merging the first usage data and the second usage data into a respective user session to generate session data.

20 Claims, 7 Drawing Sheets

Related U.S. Application Data continuation of application No. 13/968,661, filed on Aug. 16, 2013, now Pat. No. 9,426,240, which is a continuation of application No. 12/582,054, filed on Oct. 20, 2009, now Pat. No. 8,516,500, which is a continuation of application No. 10/205,810, filed on Jul. 26, 2002, now Pat. No. 7,627,872.

(51) Int. Cl.
*H04W 4/24* (2018.01)
*G06F 9/448* (2018.01)
*H04L 29/08* (2006.01)

(52) U.S. Cl.
CPC ............ *H04L 43/062* (2013.01); *H04L 43/10* (2013.01); *H04L 67/14* (2013.01); *H04L 67/146* (2013.01); *H04L 67/22* (2013.01); *H04W 4/24* (2013.01)

(56) References Cited

U.S. PATENT DOCUMENTS

| | | | |
|---|---|---|---|
| 5,796,952 A | 8/1998 | Davis et al. | |
| 5,801,747 A | 9/1998 | Bedard | |
| 5,848,396 A * | 12/1998 | Gerace | G06Q 30/02 705/7.33 |
| 5,905,713 A | 5/1999 | Anderson et al. | |
| 5,948,061 A | 9/1999 | Merriman et al. | |
| 5,991,735 A | 11/1999 | Gerace | |
| 6,070,145 A | 5/2000 | Pinsley et al. | |
| 6,108,637 A | 8/2000 | Blumenau | |
| 6,115,680 A | 9/2000 | Coffee et al. | |
| 6,138,155 A | 10/2000 | Davis et al. | |
| 6,148,333 A | 11/2000 | Guedalia et al. | |
| 6,298,348 B1 | 10/2001 | Eldering | |
| 6,327,619 B1 | 12/2001 | Blumenau | |
| 6,353,929 B1 | 3/2002 | Houston | |
| 6,377,939 B1 * | 4/2002 | Young | G06Q 30/04 705/34 |
| 6,457,010 B1 | 9/2002 | Eldering et al. | |
| 6,505,169 B1 | 1/2003 | Bhagavath et al. | |
| 6,560,606 B1 * | 5/2003 | Young | G06F 9/4881 |
| 6,643,696 B2 | 11/2003 | Davis et al. | |
| 6,662,227 B2 | 12/2003 | Boyd et al. | |
| 6,708,335 B1 | 3/2004 | Ozer et al. | |
| 6,763,386 B2 | 7/2004 | Davis et al. | |
| 6,947,922 B1 | 9/2005 | Glance | |
| 7,024,468 B1 | 4/2006 | Meyer et al. | |
| 7,043,433 B2 | 5/2006 | Hejna, Jr. | |
| 7,284,202 B1 | 10/2007 | Zenith | |
| 7,627,872 B2 | 12/2009 | Hebeler et al. | |
| 8,516,500 B2 | 8/2013 | Hebeler, Jr. et al. | |
| 2001/0014915 A1 | 8/2001 | Blumenau | |
| 2002/0032904 A1 | 3/2002 | Lerner | |
| 2002/0047899 A1 | 4/2002 | Son et al. | |
| 2002/0078441 A1 | 6/2002 | Drake et al. | |
| 2002/0099812 A1 | 7/2002 | Davis et al. | |
| 2002/0152090 A1 | 10/2002 | Kobayashi et al. | |
| 2003/0004787 A1 | 1/2003 | Tripp | |
| 2003/0028896 A1 | 2/2003 | Swart et al. | |
| 2003/0115586 A1 | 6/2003 | Lejouan et al. | |
| 2003/0149975 A1 | 8/2003 | Eldering et al. | |
| 2004/0003394 A1 | 1/2004 | Ramaswamy | |
| 2004/0019463 A1 | 1/2004 | Kolessar et al. | |
| 2004/0181818 A1 | 9/2004 | Heyner et al. | |
| 2007/0294126 A1 | 12/2007 | Maggio | |
| 2008/0086741 A1 | 4/2008 | Feldman et al. | |

FOREIGN PATENT DOCUMENTS

| | | |
|---|---|---|
| JP | 2000172665 | 6/2000 |
| JP | 2002099830 | 4/2002 |
| JP | 2004518209 | 6/2004 |
| WO | 9826529 | 6/1998 |
| WO | 9831155 | 7/1998 |
| WO | 9858334 | 12/1998 |
| WO | 9959275 | 11/1999 |
| WO | 0008802 | 2/2000 |
| WO | 0055783 | 9/2000 |
| WO | 0133752 | 10/2000 |
| WO | 0159656 | 8/2001 |
| WO | 0171620 | 9/2001 |
| WO | 02057934 | 7/2002 |

OTHER PUBLICATIONS

United States Patent and Trademark Office, "Final Office Action," mailed in connection with U.S. Appl. No. 10/205,810, dated Dec. 9, 2008, 15 pages.

United States Patent and Trademark Office, "Non-final Office Action," mailed in connection with U.S. Appl. No. 10/205,810, dated May 12, 2008, 15 pages.

United States Patent and Trademark Office, "Notice of Allowance," mailed in connection with U.S. Appl. No. 12/582,054, dated Apr. 18, 2013, 8 pages.

United States Patent and Trademark Office, "Office Action," mailed in connection with U.S. Appl. No. 12/582,054, dated Sep. 24, 2012, 7 pages.

United States Patent and Trademark Office, "Final Office Action," mailed in connection with U.S. Appl. No. 12/582,054, dated Sep. 15, 2011, 15 pages.

United States Patent and Trademark Office, "Final Office Action," mailed in connection with U.S. Appl. No. 12/582,054, dated Dec. 22, 2010, 15 pages.

United States Patent and Trademark Office, "Non-Final Office Action," mailed in connection with U.S. Appl. No. 12/582,054, dated Jun. 8, 2010, 11 pages.

Japanese Patent Office, "Office Action," mailed in connection with Japanese Patent Application No. 2004524635, dated Jul. 19, 2011, 8 pages.

Japanese Patent Office, "Office Action," mailed in connection with Japanese Patent Application No. 2004524635, dated Aug. 28, 2007, 4 pages.

Japanese Patent Office, "Office Action," mailed in connection with Japanese Patent Application No. 2008204906, dated Dec. 14, 2010, 7 pages.

European Patent Office, "Office Action," mailed in connection with European Patent Application No. 03771647.9, dated Aug. 12, 2009, 4 pages.

International Searching Authority, "International Search Report," mailed in connection with International Patent Application No. PCT/US03/22377, dated Oct. 15, 2003, 3 pages.

European Patent Office, "Supplemental European Search Report," mailed in connection with European Patent Application No. 03771647.9, dated Aug. 21, 2006, 3 pages.

European Patent Office, "Office Action," mailed in connection with European Patent Application No. 03771647.9, dated Jan. 22, 2015, 5 pages.

International Bureau, "International Preliminary Examination Report," mailed in connection with International Patent Application No. PCT/US2003/22377, dated Dec. 21, 2004, 4 pages.

International Searching Authority, "Written Opinion," mailed in connection with International Patent Application No. PCT/US2003/22377, dated Apr. 15, 2004, 4 pages.

United States Patent and Trademark Office, "Non-Final Office Action," mailed in connection with U.S. Appl. No. 13/968,661, dated Jan. 11, 2016, 6 pages.

United States Patent and Trademark Office, "Notice of Allowance," mailed in connection with U.S. Appl. No. 13/968,661, dated Apr. 22, 2016, 6 pages.

United States Patent and Trademark Office, "Notice of Allowance," mailed in connection with U.S. Appl. No. 15/216,680, dated Jun. 12, 2018, 7 pages.

United States Patent and Trademark Office, "Final Office Action," mailed in connection with U.S. Appl. No. 15/216,680, dated Mar. 28, 2018, 10 pages.

(56) References Cited

OTHER PUBLICATIONS

United States Patent and Trademark Office, "Non-Final Office Action," mailed in connection with U.S. Appl. No. 15/216,680, dated Sep. 12, 2017, 8 pages.

United States Patent and Trademark Office, "Non-Final Office Action," mailed in connection with U.S. Appl. No. 16/428,604, dated Oct. 11, 2019, 12 pages.

United States Patent and Trademark Office, "Final Office Action", issued in connection with U.S. Appl. No. 16/428,604 dated Mar. 3, 2020, 22 pages.

United States Patent and Trademark Office, "Final Office Action", issued in connection with U.S. Appl. No. 16/428,604 dated May 22, 2020, 18 pages.

\* cited by examiner

MEDIA DATA USAGE MEASUREMENT AND REPORTING SYSTEMS AND METHODS

CROSS-REFERENCE TO RELATED APPLICATION

This is patent arises from a continuation of U.S. patent application Ser. No. 15/216,680, entitled "MEDIA DATA USAGE MEASUREMENT AND REPORTING SYSTEMS AND METHODS," filed on Jul. 21, 2016, now U.S. Pat. No. 10,103,951, which is a continuation of patent application Ser. No. 13/968,661, entitled "MEDIA DATA USAGE MEASUREMENT AND REPORTING SYSTEMS AND METHODS," filed on Aug. 16, 2013, now U.S. Pat. No. 9,426,240, which is a continuation of U.S. patent application Ser. No. 12/582,054, entitled "MEDIA DATA USAGE MEASUREMENT AND REPORTING SYSTEMS AND METHODS," filed on Oct. 20, 2009, now U.S. Pat. No. 8,516,500, which is a continuation of prior U.S. patent application Ser. No. 10/205,810, entitled "MEDIA DATA USAGE MEASUREMENT AND REPORTING SYSTEMS AND METHODS," filed on Jul. 26, 2002, now U.S. Pat. No. 7,627,872. U.S. patent application Ser. No. 15/216,680, U.S. patent application Ser. No. 13/968,661, U.S. patent application Ser. No. 12/582,054, and U.S. patent application Ser. No. 10/205,810 are incorporated herein by reference in their entirety.

FIELD OF TECHNOLOGY

The application relates to methods and systems for monitoring usage of media data presented to a user through a user system.

BACKGROUND

There is considerable interest in measuring the usage of media data accessed by an audience via a network or other source. In order to determine audience interest and what audiences are being presented with, a user's system may be monitored for discrete time periods while connected to a network, such as the Internet. Large amounts of data may be compiled in a relatively short period of time, requiring substantial processing, bandwidth and storage resources.

There is also considerable interest in providing market information to advertisers, media distributors and the like which reveals the demographic characteristics of such audiences, along with information concerning the size of the audience. Further, advertisers and media distributors would like the ability to produce custom reports tailored to reveal market information within specific parameters, such as type of media, user demographics, purchasing habits and so on.

In addition, there is substantial interest in the ability to monitor media audiences on a continuous, real-time basis. This becomes very important for measuring streaming media data accurately, because a snapshot or event generation fails to capture the ongoing and continuous nature of streaming media data usage.

Based upon the receipt and identification of media data, the rating or popularity of various web sites, channels and specific media data may be estimated. It would be advantageous to determine the popularity of various web sites, channels and specific media data according to the demographics of their audiences in a way which enables precise matching of data representing media data usage with user demographic data.

It is also important to ensure relatively little if no interference with the user and the user's system by this monitoring. If the monitoring system unduly interferes with the user or the user's system, individuals will be reluctant to allow monitoring of the media data presented to them. At the same time, it is necessary to minimize such interference to avoid influencing audience behavior which could bias the monitored data.

However, as mentioned above, vast amounts of media data may be presented to a user, through a user system, in a very short period of time. Where the user's system is employed to monitor media data usage, substantial user system resources are required by existing systems to accurately monitor even for specific media data presented over a short time period, which raises the possibility of interference with the operation of the user's system.

In addition, a unique problem is encountered when monitoring usage of streaming media data from a network. Multimedia streaming delivers a steady stream of video and/or audio over the network connection. For instance, the stream may include multiple independent multimedia segments such as advertising. Further, the stream may be associated with a particular network resource such as a web page that offers content tied to the streaming media data. There are also multiple protocols and delivery technologies that result in many different types of streaming encoding, servers and players. Also, the streaming media data is often associated with additional media data having diverse formats such as but not limited to HTML, e-mail, and instant messaging.

The options for accessing and presenting media data, as well as the means for delivering media data develop and evolve at ever greater rates. For many years, over-the-air radio and television broadcasting distributed listening and viewing data in fixed formats and in long-established and well-defined channels. The task of audience measurement in this environment was relatively much simpler than now, when media data is delivered in many more formats through numerous communication systems and protocols which continually evolve. Also, there are vastly more sources for media data at this time, along with a multitude of devices and user agents for accessing and presenting media data. To be useful in the long term, an audience measurement system must be flexible and scalable while remaining cost efficient.

Therefore, systems and methods are desired that will accurately record the media data a user is accessing or is presented through a user system, while at the same time not interfering with the user or noticeably burdening the user system.

It is also desired to match the user's demographic data with data representing what was accessed or presented, and to do so in a manner which is accurate, efficient and as precise as possible.

Systems and methods are further desired that will enable advertisers, media distributors and the like to produce customized media usage reports.

Systems and methods are also desired that will accurately monitor streaming media data on a continuous and essentially real-time, basis.

It is also desired that the systems and methods be flexible and scalable, yet cost effective, enabling commercially viable media data usage monitoring despite large, rapid and unpredictable changes in usage patterns and in the needs of those who make use of reports based on the data gathered.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electro-magnetic or otherwise manifested. The term "data" as used to represent predetermined information in one physical form shall be deemed to encompass any and all representations of the same predetermined information in a different physical form or forms.

The term "media data" as used herein means data which is widely accessible, whether over-the-air, or via cable, satellite, network, internetwork (including the Internet), distributed on storage media, or otherwise, without regard to the form or content thereof, and including but not limited to audio, video, text, images, animations, web pages and streaming media data.

The terms "user" or "users" mean a person or persons, respectively, who access media data in any manner, whether alone or in one or more groups, whether in the same or various places, and whether at the same time or at various different times.

The term "user system" as used herein means any software, devices, or combinations thereof which are useful for requesting, receiving, or presenting media data for a user, including, but not limited to, computers, televisions, radios, personal digital assistants, and internet appliances. The term "user system" shall be deemed to include any data gathering system, device, object or other software that utilizes user system resources.

The term "network" as used herein includes both networks and internetworks of all kinds, including the Internet, and is not limited to any particular network or inter-network.

The term "presentation" as used herein means data in a form perceptible to a user, whether by sight, hearing, touch or otherwise, or any combination of these.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The term "object" as used herein means a distinct software module or collection of computer code that possesses (1) data that uniquely separates the module or collection of computer code from other similar modules or collections, (2) attributes constituting a predetermined subset of data types describing media data usage and/or media data users and/or any other supporting data types or users, and (3) behavior which (i) limits access to such attributes by responding only to requests conforming to a predetermined published interface, and (ii) gathers data of such predetermined subset or merges objects which possess such data.

The terms "resource control location" and "RCL" as used herein each means a service, other than a service acting as a user system, which exercises control over media data provided to a user system and is deemed to include a source or identity of pre-recorded media data on a recording medium read by a user system. The term "resource control location" shall include but not be limited to television and radio stations and channels, as well as entities which exercise control over media data supplied via the Internet or other network.

The terms "resource control location session" and "RCL session" as used herein each means the presentation of media data from a single resource control location to a user over a continuous time period.

The term "user session" as used herein means one or more resource control location sessions of a single user grouped according to predetermined criteria.

The term "content metadata" as used herein means data providing information about media data, including but not limited to, its resource control location, artist, author, title, dates, relationships to other media data, format, associated user agent, rating, description of its content, and/or the like.

In accordance with one aspect of the present invention, a method is provided for gathering data reflecting usage of media data by a user. The method comprises receiving a plurality of media data in a user system; using each of a plurality of media data usage gathering objects running on the user system to collect data reflecting usage of a respectively different portion of and/or user agent for the plurality of media data received by the user system; and using a session object to merge predetermined ones of the plurality of data gathering objects corresponding to a respective user session and/or RCL session.

In accordance with another aspect of the present invention, a method is provided for gathering data reflecting usage of media data by a user by means of a user system. The method comprises running a media data usage gathering object on the user system; receiving media data in the user system; monitoring the usage of the media data by means of the media data usage gathering object running on the user system to produce media usage data; and encapsulating the media usage data in the media data usage gathering object.

In accordance with yet another aspect of the present invention, a system is provided for gathering data reflecting usage of media data by a user of a user system. The system comprises a plurality of media data usage gathering objects each for collecting data reflecting usage of a respectively different portion of and/or user agent for, a plurality of media data received by the user system; and a session object to merge predetermined ones of the plurality of media data usage gathering objects corresponding to a respective user session and/or RCL session.

In accordance with a further aspect of the present invention, a method is provided for gathering data reflecting usage of media data by a user. The method comprises receiving media data in a user system; selecting at least some of the media data based upon predetermined criteria; in the user system compiling address data for the selected media data into a report object; and transmitting the report object to a remotely located processor.

In accordance with yet another aspect of the present invention, a method is provided for generating reports on usage of media data by users of one or more user systems. The method comprises receiving report objects generated by a user system and transmitted to a reporting system, each of the report objects reflecting usage of media data by a user of a user system; assembling the transmitted report objects into a macro report; coordinating and collecting macro reports and/or report objects from other reporting systems; and formatting macro reports for presentation.

In accordance with still another aspect of the present invention, a method is provided for gathering data concerning usage of media data by a user by means of a user system. The method comprises providing a first data gathering object for gathering within the user system usage data representing media data presented to the user within a respective user session and/or RCL session; providing a second data gathering object for gathering qualitative data; and providing a session object that merges the first and second data gathering objects within the user system.

In accordance with a further aspect of the present invention, a system is provided for gathering data reflecting usage of media data by means of a user system. The system comprises software for measuring the usage of media data including: a plurality of media data usage gathering objects each to collect data within the user system reflecting usage of a respectively different portion of and/or user agent for, a plurality of media data received by the user system; and a session object to merge predetermined ones of the plurality of media data usage gathering objects corresponding to a respective user session and/or RCL session.

In accordance with yet another aspect of the present invention, a system is provided for gathering data reflecting usage of media data by a user by means of a user system. The system comprises a data gathering object in the user system for monitoring usage of the media data based on predetermined criteria; wherein the data gathering object selects and encapsulates usage data representing usage of at least some of the media data based upon the predetermined criteria.

In accordance with yet another aspect of the present invention, a system is provided for generating reports depicting usage of media data by users of one or more user systems comprising: report objects generated by a user system and transmitted to a reporting system, each reflecting usage of media data by a user of a respective user system; a macro aggregator process running on the reporting system for collecting the transmitted report objects for producing macro reports based on a plurality of the report objects, and a presentation process running on one of the reporting system and a client thereof for formatting the macro reports to produce a presentation.

The invention and its particular features and advantages will become more apparent from the following detailed description considered with reference to the accompanying drawings.

DETAILED DESCRIPTION OF CERTAIN ADVANTAGEOUS EMBODIMENTS

Figure 1:
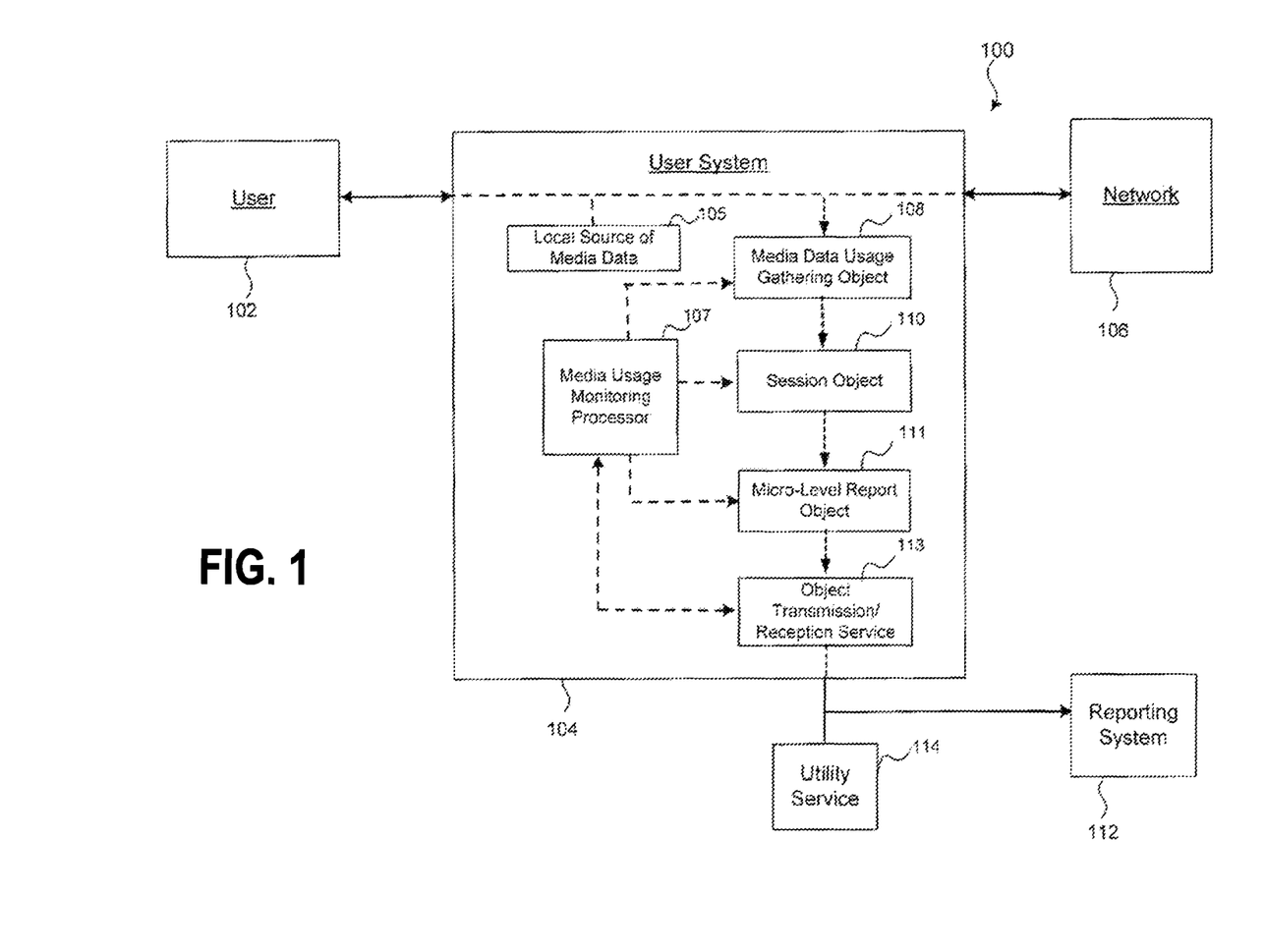
FIG. 1 is a block diagram illustrating an embodiment of a system for gathering data reflecting usage of media data presented to a user by means of a user system.

FIG. 1 illustrates a media data usage system 100 in which a user 102 is presented with media data by means of a user system 104. The user system 104 is coupled with a network 106 in order to access media data and/or present media data to the user 102. The user system 104 incorporates a local source of media data 105 from which the user system 104 also obtains media data for presentation to the user 102. The local source 105 may be, for example, a hard drive or other storage device or devices which store prerecorded media data and/or media data downloaded via network 106 and stored in local source 105 for later presentation to user 102. The user system may also serve to obtain a combination of media data both via network 106 and from local source 105 for simultaneous presentation to user 102 or combined in a stream of audio and/or video media data. The user system 104 is coupled with the network 106 in any available manner, including but not limited to over-the-air (wireless), cable, satellite, PSTN (Public Switched Telephone Network), DSL (Direct Subscriber Line), LAN (Local Area Network), WAN (Wide Area Network), intranet, and/or the Internet. The user system 104 incorporates a media usage monitoring processor 107 which implements a media data usage monitoring service within the user system 104. However, unlike previously proposed techniques the processor 107 not only gathers data representing usage of media data by means of the system 104, but also processes the gathered data to produce micro-level report objects for use by a reporting system in producing reports concerning usage of media data. Essentially, the processor 107 carries out its tasks by managing media data usage gathering objects 108 which serve to gather the usage data initially, session objects 110 which merge the objects 108 into user sessions and/or RCL sessions and micro-level report objects 111 which merge the session objects and/or other data gathering objects for reporting purposes.

In certain embodiments, the processor 107 is implemented by a dedicated device as a peripheral of the user system 104 or as a board or other device inserted within the user system 104 or otherwise coupled therewith. In certain implementations of these embodiments, the device is a programmable device provided with pre-stored instructions to implement processor 107. In other implementations, software for the processor 107 is downloaded to the device via the network 106 or other communication medium or loaded therein from a storage medium. In other embodiments the processor 107 is implemented in software running on the user system, and loaded In certain embodiments the processor 107 is dedicated to monitoring usage by only a single user. In other embodiments, the processor 107 monitors usage by two or more users of the user system 104.

The processor 107 instantiates the media data usage gathering object 108 which runs within the processor 107 or elsewhere in user system 104 for gathering usage data representing usage of media data by the user. The object 108 serves to gather usage data for a single predetermined category of media data, such as graphical data, audio data, streaming media data, video data, text, web pages, image data, and the like. In this manner, the object 108 preprocesses the usage data by selecting the data based upon predetermined criteria. In certain embodiments, each object 108 is dedicated to monitoring usage of media data of only one format, such as jpg image data, avi data, streaming media data to be reproduced by a certain player type, html, documents, bmp image data, etc. In certain embodiments, each object 108 is dedicated to monitoring usage of media data presented by means of only one type of user agent, such as a particular browser, player, etc. As new or different data formats and user agents become available, new or different objects 108 and/or object classes are provided to the processor 107 to enable monitoring thereof. The objects and object classes are received by the processor 107 via network 106 or other communication medium, or else from a storage medium. The monitoring capabilities are thus updated quickly and efficiently to keep pace with the ongoing, rapid evolution of media data formats and user agents.

In certain embodiments, the data gathered by object 108 represents media usage events such as the opening or closing of a user agent, a request for or receipt of new or different content or resource control location channel, scrolling, volume change, muting, onclick events, maximizing or minimizing a window, an interactive response to received content (such as a submission of a form or order), and/or the like. In other embodiments, the object 108 polls for predetermined media data state information, such as currently received content or currently accessed resource control location and/or the state of a user agent. Depending on the embodiment, the object 108 records either changes in state and/or the state itself. In further embodiments, the object 108 collects content metadata accompanying or associated with the media data. In other embodiments combinations of the foregoing are employed. In certain embodiments the attributes of the object 108 include times or durations of the events or state information.

In certain embodiments the object 108 gathers data at the board level (for example, a sound card), while in other embodiments it gathers data at the network level. In still other embodiments it gathers data at the operating system level, while in still further embodiments it gathers data at the application level (for example, a player, viewer or other application). In yet still further embodiments, the object 108 gathers data at two or more of the foregoing levels.

The processor 107 instantiates the session object 110 which runs within the processor 107 or elsewhere in user system 104 for merging the media data usage gathering object 108 into a respective session object which gathers data for a respective user session.

In certain embodiments the user session is defined by grouping media data usage gathering objects based on time or duration criteria. In various such embodiments, media data usage gathering objects representing usage (presentation or access) within each of predetermined time periods (such as dayparts or days) are grouped in corresponding user sessions. In other such embodiments, media data usage gathering objects representing one or more continuous and/or overlapping resource control location sessions are grouped in a single user session, while in further such embodiments media data usage gathering objects representing resource control location sessions separated in time by no more than a predetermined period are grouped into a single user session. In still other such embodiments combinations of the foregoing criteria are employed to group the objects into user sessions.

In other embodiments the user session is defined by grouping media data usage gathering objects based on indications of user activity. In various such embodiments, user inputs (for example, by means of a keyboard, keypad, pointing device, dial, remote control or touch screen, or an activity such as the insertion of prerecorded media in a disk drive, tape player or the like) are monitored to detect continuing user activity to determine the duration of a user session.

In further embodiments, users are asked to indicate the beginning and/or the end of a user session.

In certain embodiments of the invention one or more of the following attributes are included in the session objects:
  (1) "Session start": the time that an RCL is first accessed by the user system and the media data is delivered thereto, or else when such media data is first presented to the user;
  (2) "Session stop": the time that the user system ceases to access the RCL, or else when presentation of its media data to the user ceases;
  (3) "Session duration": the duration of a user session, which may be measured as the length of time between Session start and Session stop;
  (4) "Session content": the type and identity of the presented or accessed media data;
  (5) "Session interaction": user interaction events occurring during a user session;
  (6) "Session content events": media data events occurring during a user session;
  (7) "Session context": system events occurring during a user session;
  (8) "Session metadata": data describing the user session and any supporting data.

The processor 107 instantiates the micro-level report object 111 which serves to merge session objects and/or other objects into itself, and/or to encapsulate data, for supply to one or more reporting systems for producing media usage reports. In certain embodiments, the object 111 merges one or more session objects representing the media data usage of a single user into a corresponding micro-level report object, while in others the object 111 merges session objects into a micro-level report object representing media data usage by multiple identified users. In certain embodiments the object 111 merges one or more session objects representing media data usage within a predetermined time span, while in other embodiments the object 111 merges session objects in response to a request from a reporting system 112 coupled with the user system 104 either through the network 106 or via a different communication medium.

In certain embodiments, the media data usage-gathering object 108 provides its data directly to the micro-level report object, rather than merging into a session object. This feature enables the micro-level report object to gather and encapsulate data at levels other than a user session level. One particularly advantageous, but not exclusive, application for this feature is the ability to gather and convey data representing a respective RCL session on a given user system. This capability permits media usage data to be collected, inter alia, for interim reporting. Interim reporting capability is desired for monitoring ongoing usage trends in the case of streaming media of a respective RCL, to enable dynamic streaming adjustments based on real-time user profiles and habits. For example, the choice of an advertisement to insert in the stream can be based on monitoring of such usage trends in this manner.

In certain other embodiments, an RCL session object is provided to merge media data usage gathering objects representing usage within a respective RCL session. The RCL session object either gathers data until merged into a micro-level report object for interim reporting, or else merges media data usage gathering objects representing usage within all or part of a respective RCL session. In certain embodiments, a micro-level report object merges one or more RCL session objects for a given RCL session to provide a report of the RCL session.

In certain embodiments, the micro-level report objects 111 are arranged to report media usage data for one or more user sessions and/or RCL sessions in response to selectable parameters including a defined time period, one or more designated RCL's and/or users. In various ones of the embodiments in which media usage data is reported by micro-level report objects 111, the objects 111 are also arranged to gather and/or merge objects which gather quality of service data from the user system, including bandwidth usage, network quality, sound quality and/or video quality for one or more user sessions, RCL and/or RCL sessions.

In certain embodiments, the object 111 merges session objects and/or other objects, or gathers data, reflecting usage of only a single type of media data, while in other embodiments the object 111 merges objects and/or gathers data representing usage of multiple different types of media data. In still further embodiments, various combinations of the foregoing parameters are used by the object 111 to merge the objects and/or gather data.

A bi-directional object transmission/reception service 113 is implemented by the user system either within the processor 107 or external thereto. The service 113 communicates with a reporting system 112 to receive requests for micro-level report software running on the user system, and loaded therein from the network 106 or other communication medium, or from a storage medium.

Figure 1A:
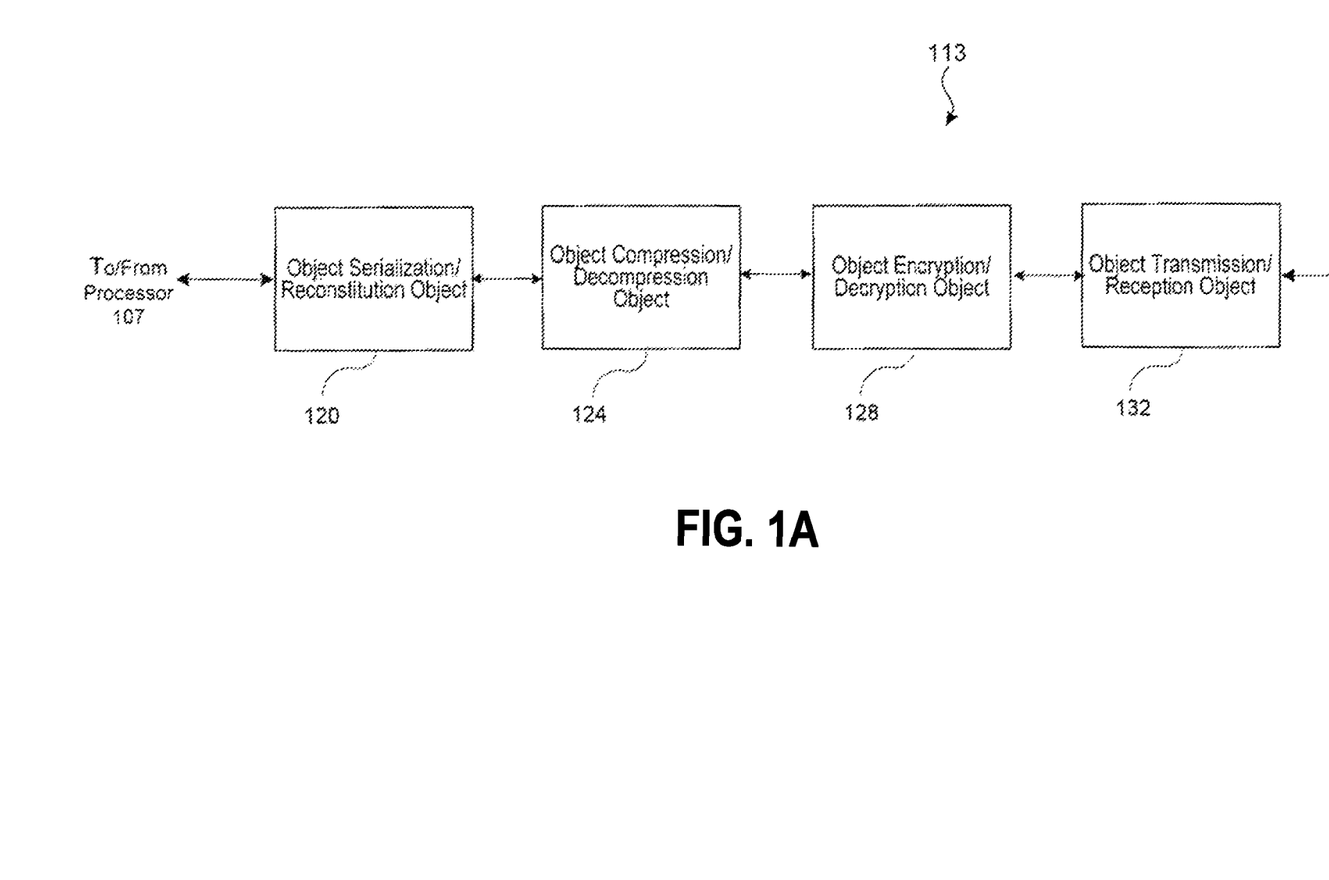
FIG. 1A is a block diagram of a transmission service of the FIG. 1 embodiment.

An embodiment of the object transmission/reception service 113 is illustrated in FIG. 1A. In use to communicate a micro-level report object 111 to the reporting system 112, an object serialization process 120 of service 113 serializes the micro-level report object 111 into data capturing all identity, state and behavior of the object 111. While any serialization technique may be implemented by process 120, in certain embodiments the process 120 employs a binary object serialization technique that translates the identity, behavior and state of object 111 into a binary data stream. In other embodiments, the process 120 performs a Simple Object Access Protocol (SOAP) compliant serialization of the object 111. In further embodiments, an HTTP request/reply protocol is employed. Preferably, but not necessarily, the process 120 supports multiple serialization algorithms to facilitate communication with various reporting systems 112 as well as with one or more utility services 114.

An object compression/decompression process 124 subjects the serialized object 111 to no-loss compression, in accordance with any appropriate technique. Preferably, but not necessarily, the process 124 supports multiple compression algorithms to facilitate communication with various reporting systems 112 and one or more utility services 114.

An encryption/decryption process 128 encrypts the compressed object 111 by means of any technique providing sufficient security to preserve the integrity of the report object 111 by protecting it against tampering and user manipulation. As in the case objects from a single utility service 114 which supplies the same to all media data monitoring processors in all user systems which cooperate to provide reports of media data usage to the reporting system 112. The communications from utility service 114 preferably are implemented by a transmission service corresponding to service 113. Accordingly, such communications when received by service 113 are first received by the object transmission/reception process 132 implementing the appropriate communication protocol and then decrypted by process 128 and decompressed by process 124. Then the decompressed communication is reconstituted by process 120 for use by processor 107.

Figure 2:
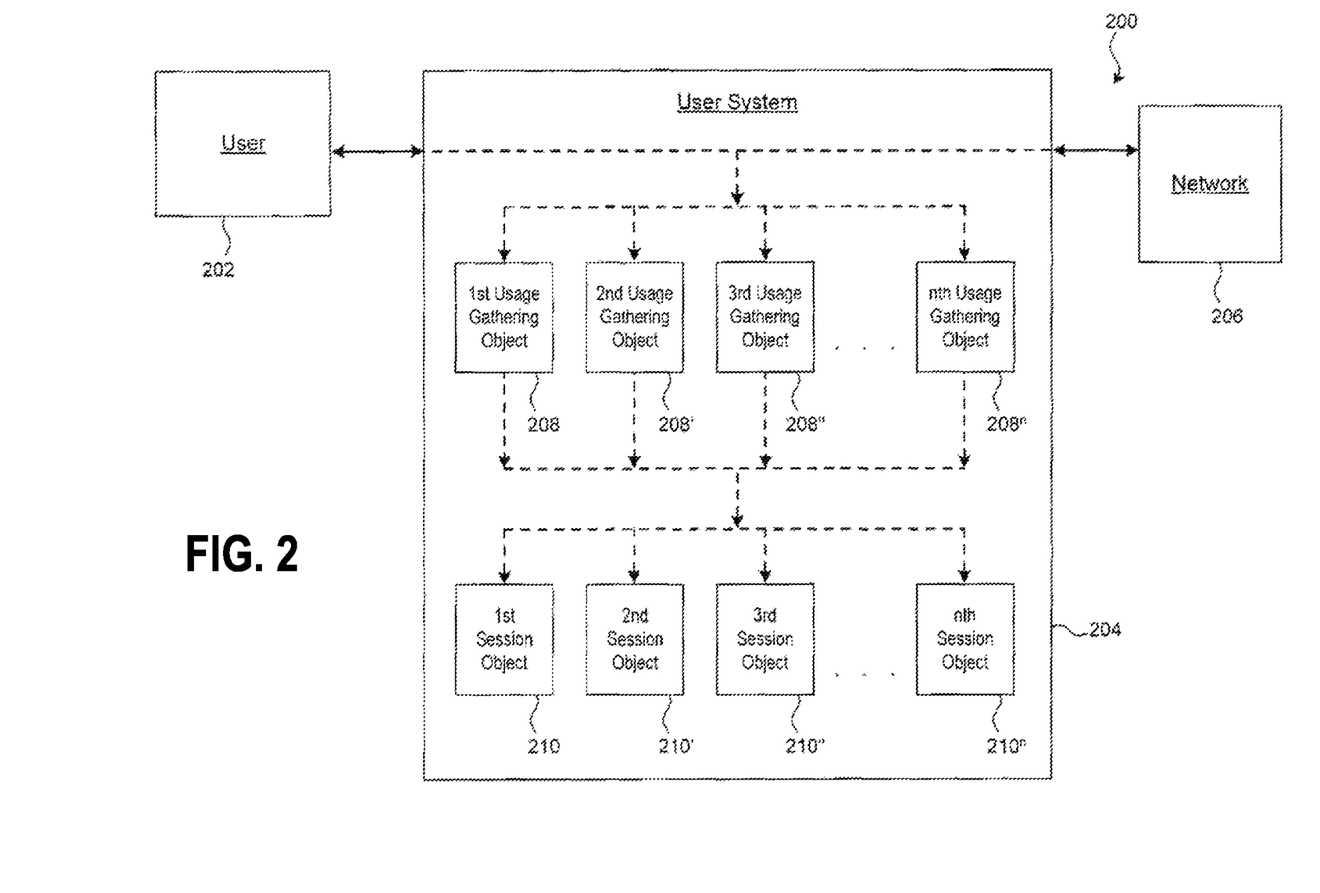
FIG. 2 is a block diagram illustrating another embodiment of a system for gathering data reflecting usage of media data presented to a user by means of a user system.

FIG. 2 illustrates a further media data usage system 200 in which a user 202 is presented with or accesses media data by means of a user system 204. The user system 204 may be connected to a network 206 in order to access or present the media data to the user 202. The user system 204 also incorporates a local source of media data (not shown for purposes of simplicity and clarity), corresponding to local source 105 of FIG. 1.

The user system 204 incorporates a media usage monitoring processor and an object transmission/reception service (not shown for purposes of simplicity and clarity) corresponding to processor 107 and service 113 of FIG. 1. In addition, the processor incorporated in user system 204 serves to create and manage multiple instances of media data usage gathering objects 208, 208', 208", . . . 208$_n$, corresponding to object 108 of FIG. 1 which run concurrently and/or at various differing times in order to track usage of different respective media data types and/or user agents. For example, if user of process 120 and 124, it is preferable, but not necessary, that process 128 implement multiple encryption algorithms to facilitate communication with various reporting systems 112 and one or more utility services 114.

An object transmission/reception process 132 serves to establish communication with the reporting system 112 and/or the utility service 114 via network 106 or other communication medium. Where the object transmission/reception service 113 communicates with the system 112 via the Internet, or other TCP/IP network, for example, the process 132 implements the TCP and IP layers and maintains the connection with the reporting system 112 and one or more utility services 114. Preferably, but not necessarily, the process 132 supports multiple communications protocols to facilitate communications with reporting system 112 and one or more utility services 114.

In certain embodiments, one or more of the processes 120, 124, 128 and 132 of service 113 are also utilized by other applications running on user system 104 for communications, while in other embodiments the processes 120, 124, 128 and 132 are utilized only for communications to/from processor 107, including transmission of micro-level report objects 111.

As noted above, object transmission/reception service 113 supports bi-directional communication by the processor 107. In certain embodiments, this capability is employed to obtain from utility service 114 updates to the objects 108, 110 and 111 as well as to add new objects and object classes, such as new types of media data usage gathering objects for monitoring usage of new or different types of media data and/or user agents. Preferably, but not necessarily, processor 107 receives such updates and new objects and to communicate the requested objects thereto. The service 113 also receives updated objects and object classes from a utility service 114. In certain embodiments, the service 114 is implemented by the reporting system 112, while in others it is implemented separately therefrom. Communications between service 113 and reporting system 112, as well as between service 113 and utility service 114 in certain embodiments are conducted via network 106, while in others such communications are conducted via a different communication medium.

In certain advantageous embodiments, multiple reporting systems distribute reporting services among multiple network nodes at which reporting entities or customers of reporting entities produce either standardized or customized reports from micro-level report objects obtained from multiple participating user systems, such as user system 104. In such embodiments, the micro-level report objects are implemented as network-mobile objects capable of being communicated to multiple, distributed reporting nodes and assembled into either standard macro-level reports constructed from multiple micro-level report objects, or custom-created macro reports assembled from micro-level report objects using whatever parameters the reporting entity or customer may wish to choose.

In certain embodiments the service 113 is implemented by means of a dedicated device as a peripheral of the user system 104 or as a board or other device inserted within the user system 104 or otherwise coupled therewith. In such embodiments the service 113 preferably, but not necessarily, is implemented by a device which also implements the processor 107. In other embodiments the service 113 is implemented in 202 opens a browser, in certain embodiments the processor instantiates a browser usage data gathering object to track its usage. If an audio and/or video player is also opened while the browser is in use, the processor instantiates a player usage data gathering object to track its usage separately from the browser. The same is also done in order to track usage of other types of user agents such as a chat application.

In further embodiments, separate usage gathering objects track usage of different media data. For example, one object will track use of a web page while one or more other objects will monitor advertisements which run within or appear in separate pop-up and/or pop-under windows. In still further embodiments, one set of objects tracks usage of different types of user agents while others monitor usage of multiple respective media data presented by means of a single user agent. The usage monitoring system, therefore, automatically gathers data concerning usage of multiple different media data types and/or user agent types into different respective objects, so that the gathered data is easily accessible by type of media data used or user agent employed. The processor is also capable of creating and managing multiple instances of session objects 210, 210', 210", . . . , 210$_n$ which run concurrently and/or at various different times in order to merge appropriate ones of the objects 208, 208', 208", . . . 208$_n$ into respective user sessions. Each such object gathers media data usage data into objects each representing activity during a respective user session, and thus serves to pre-process this data to facilitate preparation of media usage reports at a later stage. Excess processing, storage and communication bandwidth resources of the user system 204 are thus utilized to produce session objects arranging usage data by session, media data type and/or user agent type. The session objects then are analogous to building blocks that may be assembled efficiently into any number of reports each structured as desired according to selected reporting parameters. The structures of the reports may be standardized or designed on an ad hoc basis to best serve the needs of a user of the reporting system. Preferably, the processor 107 and service 113 track the ongoing extent to which user system and communication resources are being used in order to adjust their demands on these resources to avoid interference with other applications and communications employed by the user.

As in the embodiments of FIG. 1, the session objects are merged into micro-level report objects for communication to one or more reporting systems (not shown for purposes of simplicity and clarity).

Figure 3:
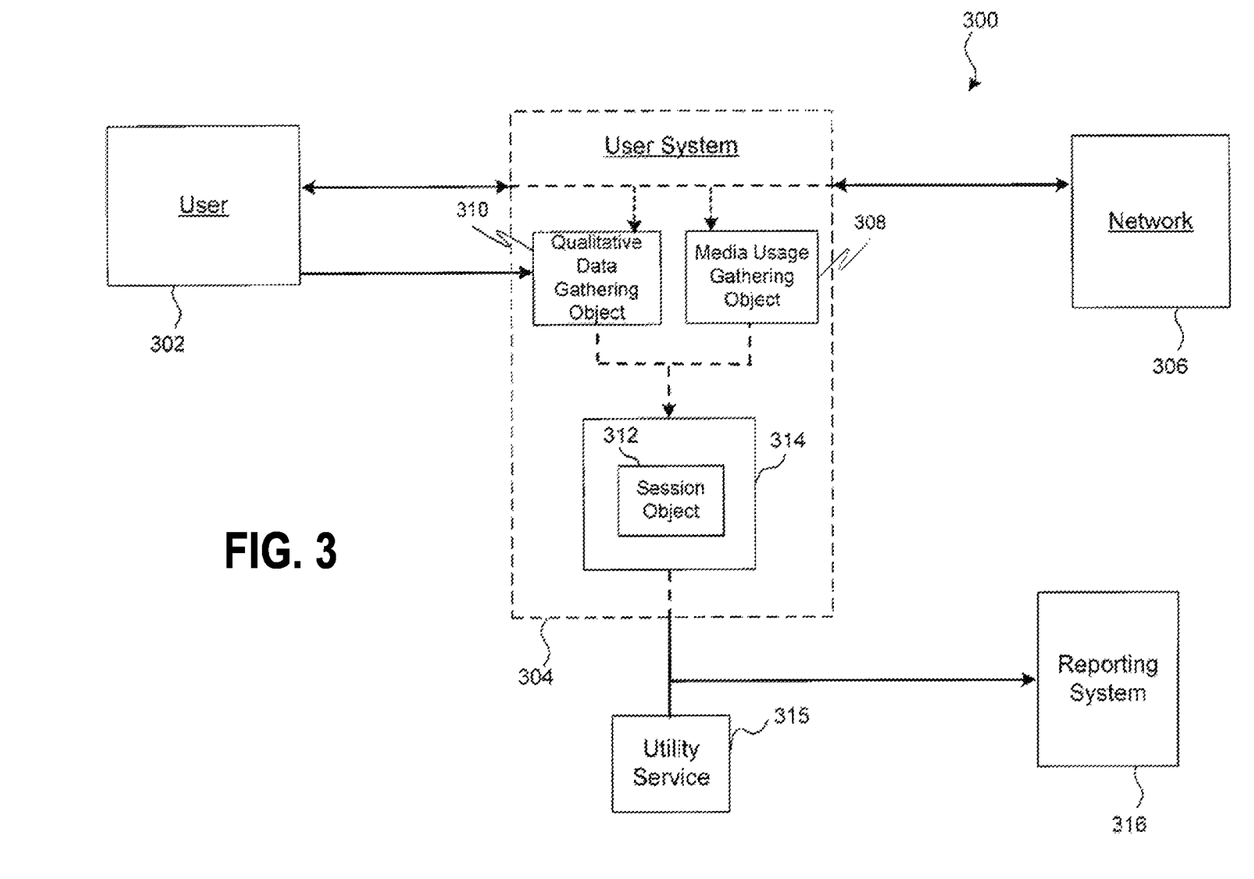
FIG. 3 is a block diagram illustrating yet another embodiment of a system for gathering data reflecting usage of media data presented to a user by means of a user system.

FIG. 3 illustrates a still further media data usage system 300 in which a user 302 is presented with or accesses media data by means of a user system 304. The user system 304 may be connected to a network 306 in order to access media data. As in the case of the FIG. 2 embodiment, the user system 304 also incorporates a local source of media data (not shown for purposes of simplicity and clarity) corresponding to local source 105 of FIG. 1.

The user system 304 incorporates a media usage monitoring processor (not shown for purposes of simplicity and clarity) which serves to instantiate and manage one or more media data usage gathering objects 308 serving the same purpose as objects 108 of FIG. 1. The processor also instantiates and manages one or more qualitative data gathering objects 310 which serve to gather qualitative data concerning the users of user system 304. The qualitative data gathering objects 310 in certain embodiments collect and/or store basic demographic data which can include user age, sex, race, ethnicity, marital status, and/or location. In additional embodiments the objects collect and/or store further user-specific information which can include spending habits, interests, lifestyle, education, occupation and/or income. Such qualitative data is gathered, for example, by a request to the user presented through user system 304 and/or from databases which store such information.

In certain embodiments, the objects 310 collect and/or store qualitative data constituting system data, such as system type, operating system, types of user agents (such as browser, players and the like). Such data may be collected by objects 310 directly from user system 304. In further embodiments the objects 310 collect and/or store qualitative data of two or more of the foregoing types. In short, each of the objects 310 is arranged to collect a subset of the various qualitative data types. In certain embodiments, the objects 310 are updated from time to time to enable the collection and/or storage of new or different data and/or data types.

The processor also instantiates and manages one or more session objects 312 which serve to merge the media data usage gathering objects 308 and qualitative data gathering objects 310 into respective user sessions and/or RCL sessions. In this manner, the session objects encapsulate session data describing both media data usage as well as user demographics and/or system information. In this manner, any and all data desired for describing a given user session and/or RCL session is pre-processed by the user system 304, thus taking advantage of excess processing and storage resources thereof. This contrasts with previously proposed techniques in which qualitative data would be merged with quantitative media data usage monitoring data at a centralized processing facility. Not only does the invention in its present aspect reduce the processing and storage requirements outside the user system, but it also unites media usage measurement data with demographic and other qualitative data at the earliest stage which permits the production of reports which "drill down" to the user or RCL session level, thus providing greater reporting precision and flexibility.

Through the use of distributed data collection and processing by means of various data collection and processing objects, the monitoring system of the present invention enables rapid scalability as well as the ability to adjust the monitoring system over time without interruption to accommodate evolving needs to track new and different forms of media data usage, user systems and demographic categories. This is achieved by downloading updated and new object classes to the processors operating in various user systems.

The session objects 312 are merged into a micro-level report object 314 for communication to a reporting system 316. Preferably, the micro-level report object 314, as well as object 111 of FIG. 1 are arranged to have network mobility to enable report generation both in systems 112 and 316 as well as at other nodes and systems in certain embodiments as well as distributed report generation capabilities in still other embodiments.

Figure 4:
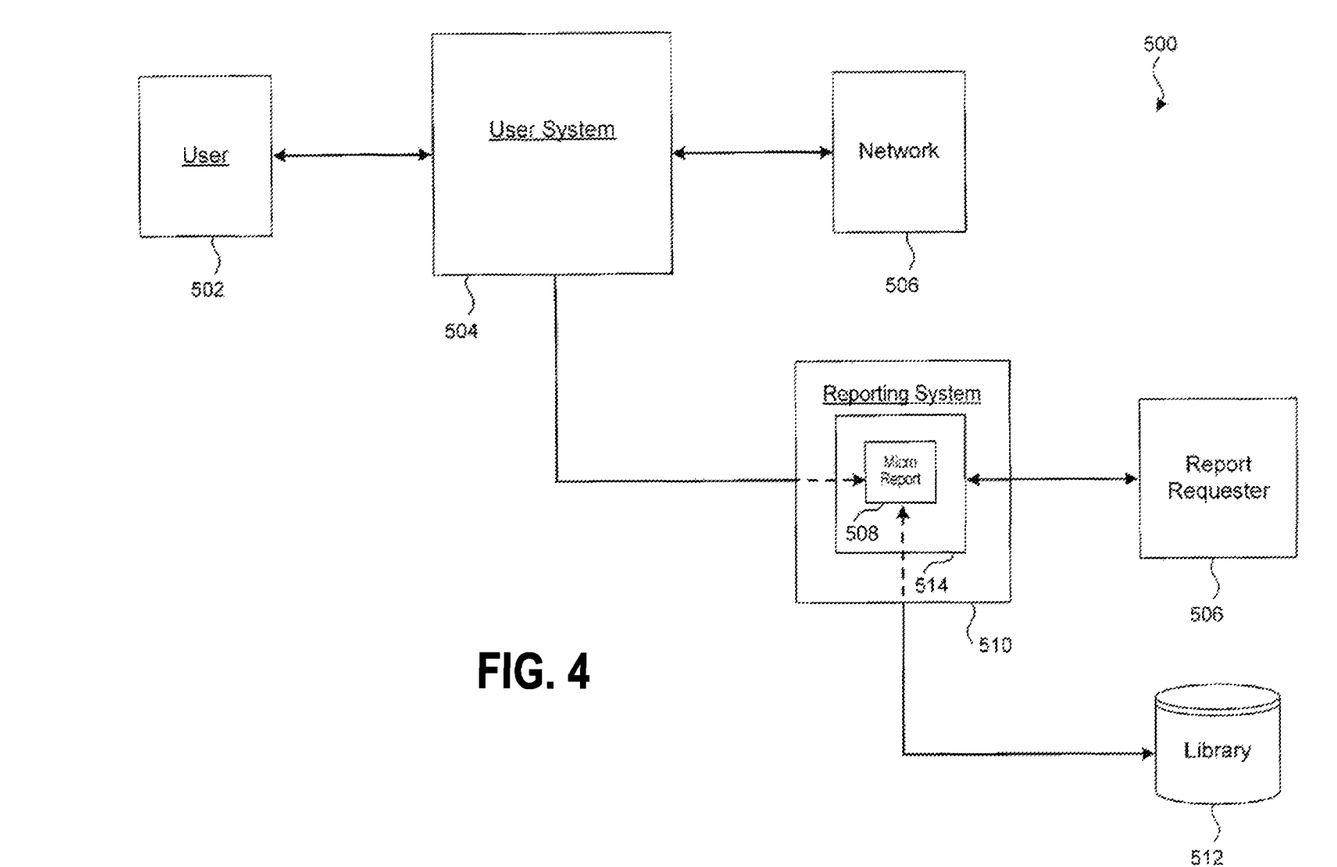
FIG. 4 is a block diagram illustrating a further embodiment of a system for gathering data reflecting usage of media data presented to a user by means of a user system.

FIG. 4 illustrates a media data usage monitoring system 500, for gathering usage data representing usage of media data presented to a user 502. The user 502 accesses or is presented with media data by means of a user system 504. The user system 504 may be connected to a network 506 in order to access or present the media data to the user 502. The user system 504 also incorporates a local source of media data (not shown for purposes of simplicity and clarity), corresponding to local source 105 of FIG. 1.

A micro-level report object 508, is generated, serialized, compressed and encrypted in the user system 504 in accordance with any of the foregoing embodiments for transmission to a reporting system 510. Once the micro-level report object 508 is received by reporting system 510, it is reconstituted for utilization. Reporting system 510 aggregates and organizes numerous micro-level report objects 508 received from the user system 504 as well as from other user systems, in order to produce a macro report 514 in response to a command from a report requester 506 such as an entity providing such reports to customers in exchange for a license fee or an entity that wishes to make direct use of such reports.

Reporting system 510 has access to a library 512 containing various information for identification of the resource control locations (RCL's) of the media data contained in the micro-level report object 508. The library 512 is particularly useful in those instances in which the identity of the RCL is not included in metadata accompanying the received media data. The library 512 comprises an RCL map of various URL's, for instance, for identifying the RCL's of the gathered media data based on its URL or URL's. The RCL map is compiled in one or more ways. In certain embodiments, the RCL itself provides the necessary data for inclusion in library 512. In other embodiments, the data is compiled automatically by a service associated with library 512 which gathers URL's while accessing various RCL's. In further embodiments, the data is compiled by manual input. In still further embodiments, the data is compiled by comparing URL's corresponding to known resource control locations with URL's for other pages, streams or other media data and associating similar URL's with the same RCL. For example, two URL's having the same root may be deemed associated with the same resource control location. In still other embodiments, tags, metadata and/or content of various media data are compared to determine their RCL's. In still further embodiments combinations of the foregoing techniques are employed. In one embodiment, the library 512 resides in a centralized location, which facilitates updating the data contained thereon. Alternatively, the library 512 resides in various locations on various systems, either local or remote.

RCL mapping is also utilized for identifying the resource control location of predetermined streaming media data contained in the micro-level report object 508 even though a streaming resource may have many URL's mapped to the same RCL. The streaming media data however, is mapped to a specific streaming RCL.

In certain embodiments, library 512 also provides further data useful to reporting system 510, including time of day, related RCL information, and supplemental demographic information, such as information on spending habits, income, interests and any other data of potential interest to advertisers or providers of media data concerning users or households. In further embodiments one or more of these data services is provided by systems separate from library 512. In still others, one or more of these services, including an RCL-mapping service, are distributed among multiple servers on one or more networks.

Figure 5:
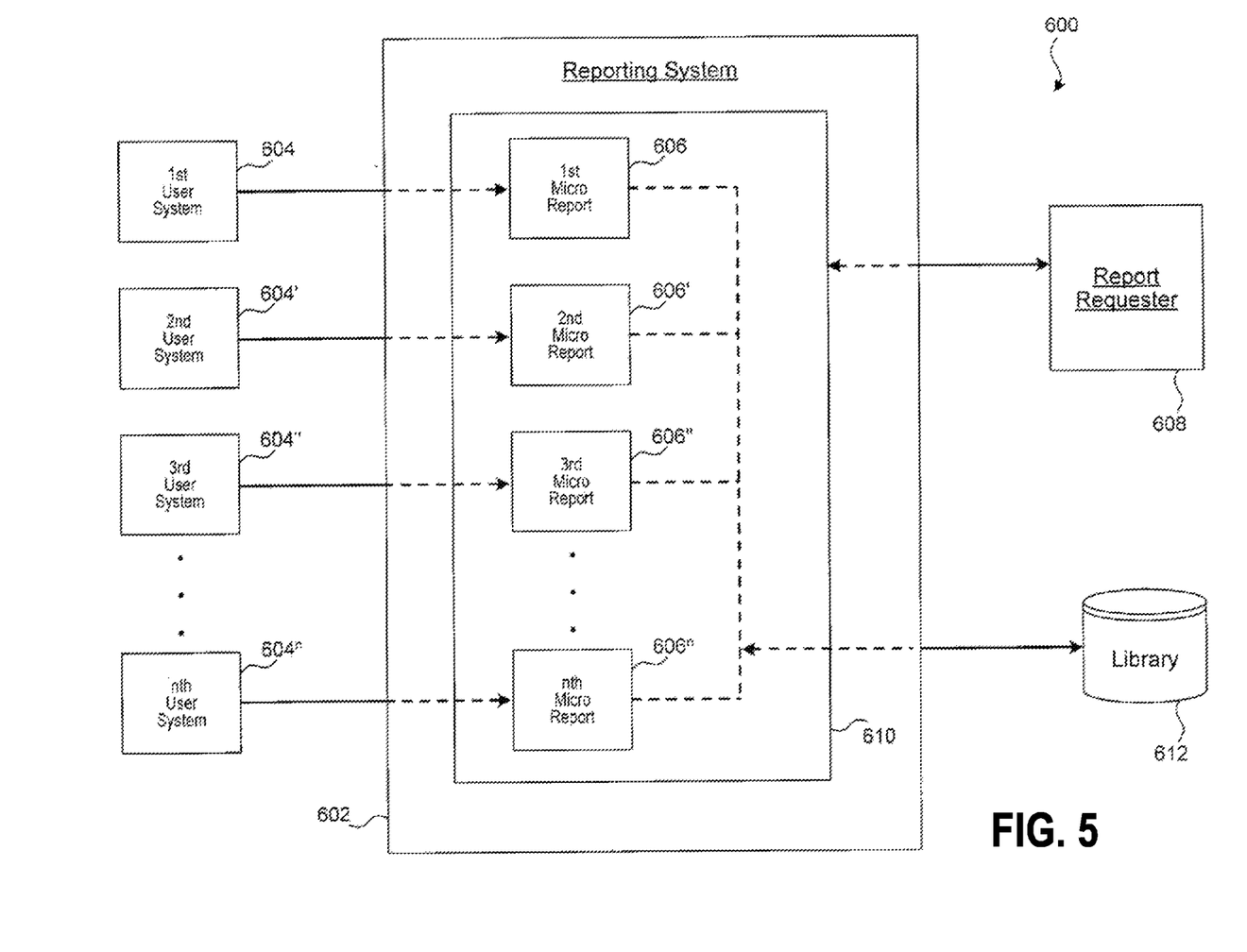
FIG. 5 is a block diagram of a report generation system for producing reports of media data usage.

FIG. 5 illustrates a report generation system 600, including a reporting system 602, for generating reports based upon data in the form of at least one micro-level report object 606, received from at least one user system 604. The reporting system 602 also has access to numerous micro-level report objects (606, 606', 606", . . . $606_n$), from numerous user systems (604, 604', 604", . . . $604_n$) for producing macro reports selectively on either a standard or customized basis in response to report generation parameters input to the system.

Reporting system 602 has access to library 612 containing information for identification of the RCL of the media data whose usage is reported in micro-level report objects (606, 606', 606", . . . $606_n$), received from the same and/or various user systems (604, 604', 604", . . . $604_n$). The library 612 again may comprise a comprehensive RCL map of numerous URL's, for instance, for identification of the gathered media data. In certain embodiments, the library 612 provides further information (as described above in connection with FIG. 4), and in other embodiments the services provided by library 612 are provided by multiple distributed systems.

A report requester 608, may request reporting system 602 to generate one or more macro reports 610 based on various micro-level report objects (606, 606', 606", . . . $606_n$). The report requester 608 supplies reporting system 602 with a request for a macro report either of a standard or customized type. If a customized report type is requested, the request includes parameters defining the types of media data, users, time periods, etc., which define the scope and content of the desired customized report. Reporting system 602 assembles the required micro-level report objects, specified by report requester 608, to form macro reports 610, which are combined reports on overall media data usage. Reporting system 602 can assemble micro-level report objects (606, 606', 606", . . . $606_n$) along various parameters to offer appropriate information relating to specific media data and/or demographic parameters. Macro reports 610 may be created on-demand or may be pre-scheduled for generation and delivery.

Figure 6:
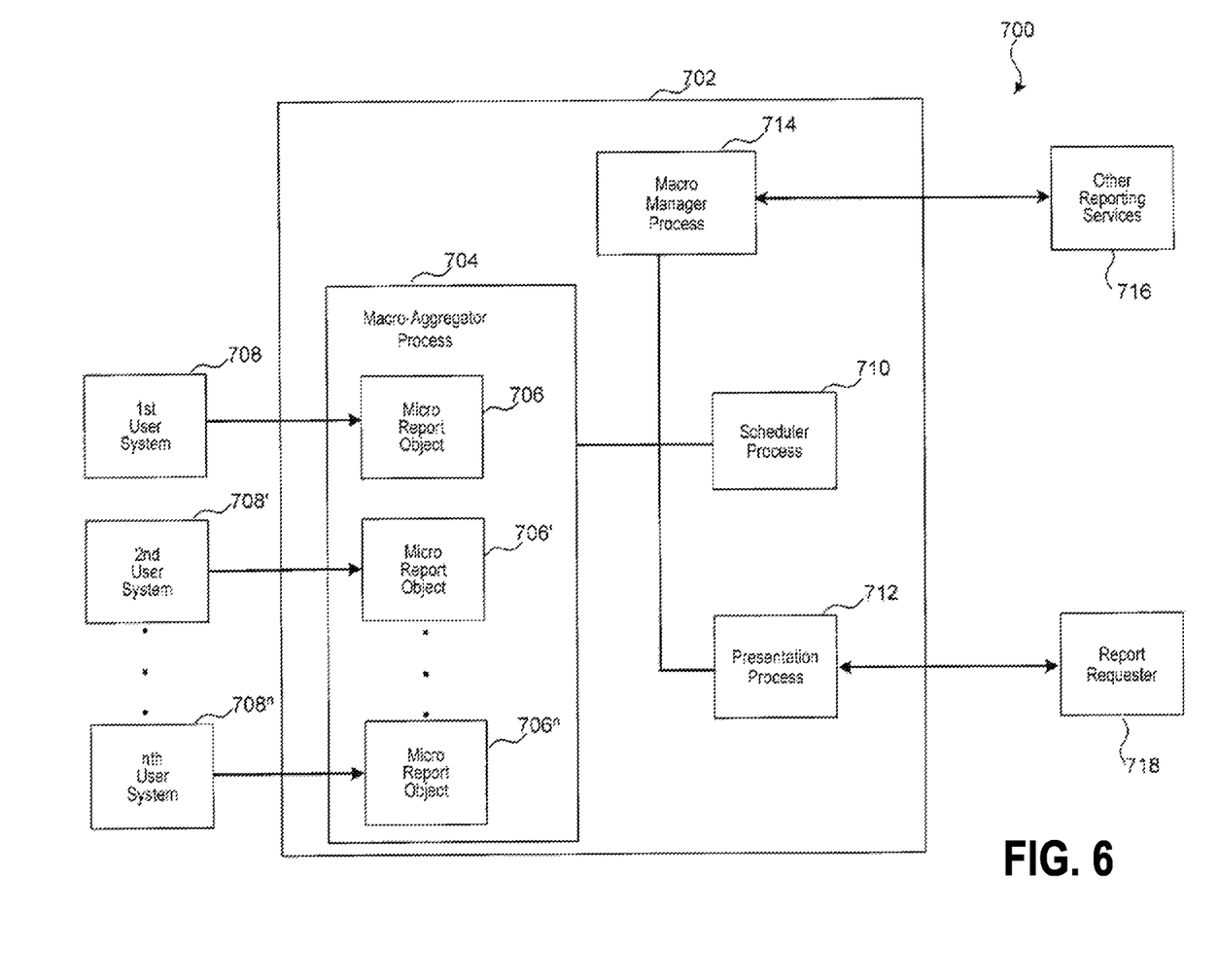
FIG. 6 is a block diagram of a further report generation system for producing reports of media data usage.

FIG. 6 illustrates a report system 702. Report system 702 comprises a macro-manager process 714 which manages further objects and external resources to produce reports for provision to a report requester 718. System 702 further comprises a macro-aggregator process 704 that collects and manages various micro-level report objects (706, 706', . . . $706_n$) received from various user systems (708, 708', . . . $708_n$). Report system 702 also includes a scheduler process 710 for saving various reporting schedules and reports. Report system 702 further comprises a presentation process 712 for formatting macro reports for various presentation mediums.

The macro-aggregator object 704 in certain embodiments receives the micro-level report objects 706 according to a schedule retained by each user system 708, 708', . . . $708_n$. In certain other embodiments, the process 704 requests the micro-level report objects 706 from the various user systems pursuant to a schedule maintained by scheduler process 710 in report system 702. In further embodiments, the process 704 requests the micro-level report objects 706 in order to fulfill a request for a report received from report requester 718. In still further embodiments, combinations of the foregoing techniques are employed.

In one or more such embodiments, the process 704 communicates requests to the various user systems 708, 708', . . . 708$_n$ for micro-level report objects reflecting ongoing usage of streaming media. Such requests from process 704 in some cases result from receipt of an ongoing streaming media usage report request from requester 718 seeking information on the present size and/or composition of an audience for streaming media of one or more predetermined resource control locations. Such reports enable the requester 718 or its customer to maximize its advertising revenues by targeting the ads to the present audience and/or based on the actual number of users who received certain advertisements. In other embodiments, when process 704 receives one or more micro-level report objects from a user system 708, 708', . . . 708$_n$ indicating current usage of streaming media from an RCL of interest, process 704 automatically requests further such micro-level report objects from such user system to produce an ongoing usage report pursuant to a prior request from a report requester 718.

The macro-aggregator process 704 stores the received objects 706, 706', . . . 706$_n$ in a database for subsequent access according to their attributes, such as time, demographic characteristics, RCL, type of media data used, etc. It is thus possible to quickly and efficiently produce macro reports according to standardized parameters or custom-designed parameters. Each micro-level report object represents a distinct media data usage experience which may be accessed according to any of multiple different selected parameters and assembled with other such objects in a process-efficient manner which provides flexible reporting capabilities to meet the needs of each requester.

Macro reports at times are produced by the macro-aggregator process 704 in response to a command received from scheduler process 710 pursuant to a report schedule maintained thereby. Once produced, the macro-reports are stored by scheduler process 710 to be provided to requesters according to a reporting schedule also maintained by process 710 or in response to a request from requester 718.

Presentation process 712 serves to format the produced macro reports according to a presentation format specified by requester 718 or else in a default or other predetermined format. In certain embodiments, such formats may be selected as appropriate for browsers running on a computer, for Internet appliances, PDA's, facsimile, email, printed reports, audible reports, and the like. In certain embodiments, a different respective presentation process 712 is provided for each different presentation format.

In certain embodiments a single report system 702 gathers the micro-level report objects and serves the various report requesters 718. In other embodiments, multiple such report systems 702 distribute the reporting tasks. In further embodiments the services provided by one or more reporting systems are distributed among two or more different systems. In some of such further embodiments, a macro report aggregator process is implemented by one or more servers which supply macro-reports on schedule or on demand to one or more clients which receive requests for reports from requesters and format the macro reports for presentation to such requesters. In certain embodiments one or more of the services provided by the report system 702 are implemented by a client running on a requester system. For example, in some such embodiments such a client implements both the scheduling and presentation services implemented by system 702 of FIG. 6. The object-oriented design of the system enables multiple different kinds of implementations.

The object-oriented design of the reporting and utilities services provide substantial flexibility in the physical architecture adopted to implement these services. In an Internet (or other network) based server architecture, the various reporting and/or utilities services are distributed among various servers. In some embodiments of server-based services, the servers are arranged in a hierarchy to efficiently distribute the services according to priority and/or scope. In embodiments which employ a P2P architecture, all of the reporting and/or utilities services are distributed among clients, although preferably certain services such as object and object class updating services are coordinated to ensure system integrity. In hybrid embodiments, combinations of the foregoing architectures are employed. For example, heavy users of reporting services might implement the services on their own client machines, while users who use fewer reports or obtain them less frequently might receive preformatted reports from a report server.

Although the invention has been described with reference to particular arrangements and embodiments of services, systems, processors, devices, features and the like, these are not intended to exhaust all possible arrangements or embodiments, and indeed many other modifications and variations will be ascertainable to those of skill in the art.

What is claimed is:

1. An apparatus for gathering data for media usage reports for a processing device, the apparatus comprising:
   means for gathering first usage data representative of usage of first media on a processing device, the first media being received from an external network source, the first usage data corresponding to at least one of (i) a first media type or (ii) a first user agent associated with the first media;
   means for gathering second usage data representative of usage of second media on the processing device, the second media being received from a source that is local to the processing device, the second usage data corresponding to at least one of (i) a second media type or (ii) a second user agent associated with the second media; and
   means for merging the first usage data and the second usage data into a respective user session to generate session data.

2. The apparatus of claim 1, further including means for providing a report of the user session.

3. The apparatus of claim 2, further including means for merging the session data into the report.

4. The apparatus of claim 2, further including means for merging the user session into the report.

5. The apparatus of claim 4, further including means for generating a macro report based on the report.

6. The apparatus of claim 1, further including means for preprocessing at least one of the first usage data or the second usage data by gathering the first usage data or the second usage data based on predetermined selection criteria.

7. The apparatus of claim 1, wherein the session data includes qualitative data, further including means for including and relating at least one of the first usage data or the second usage data and the qualitative data.

8. The apparatus of claim 1, wherein:
   the first media includes at least one of first graphical data, first audio, first streaming media, first video, first text, a first web page, or a first image; and the second media includes at least one of second graphical data, second audio, second streaming media, second video, second text, a second web page, or a second image.

9. An apparatus for generating a report on usage of media by a processing device, the apparatus comprising:
   means for accessing a report object generated by the processing device, the report object reflecting usage of media on the processing device, the report object generated regardless of whether the media was received in the processing device from a network source or a source local to the processing device; and
   means for assembling the report object into a macro report in accordance with predetermined parameters.

10. The apparatus of claim 9, wherein the accessing of the report object the assembling of the report object into the macro report are performed at a first reporting system, and further including means for collecting at least one of (1) the macro report or (2) the report object from a second reporting system.

11. The apparatus of claim 9, wherein the report object represents gathered usage data for a single predetermined category of media.

12. The apparatus of claim 9, further including means for merging a session object corresponding to at least one of a respective user session or a RCL session into the report object.

13. The apparatus of claim 12, wherein the session object is to encapsulate qualitative data.

14. The apparatus of claim 13, wherein the session object is to relate the media usage and the qualitative data.

15. The apparatus of claim 9, wherein the media includes streaming media.

16. An apparatus for managing reports in a reporting system on usage of media on a processing device, the apparatus comprising:
   means for accessing, with the reporting system, at least one of (1) a macro report or (2) a report object generated by the processing device from a second reporting system, the report object reflecting usage of media by a user of the processing device, the report object being generated regardless of whether the media was received from a network source or a source local to the processing device, the report object corresponding to at least one of (i) different media types or (ii) different user agents associated with the media, the macro report including the report object assembled in the second reporting system; and
   means for formatting the macro report for presentation.

17. The apparatus of claim 16, further including means for merging a session object corresponding to at least one of a respective user session or a RCL session into the report object.

18. The apparatus of claim 17, wherein the session object encapsulates qualitative data.

19. The apparatus of claim 16, wherein the means for formatting the macro report for presentation includes means for formatting the macro report based on a presentation format specified by a requester.

20. The apparatus of claim 16, further including means for storing the macro report.

* * * * *